United States Patent [19]

Raoult

[11] Patent Number: 4,706,225

[45] Date of Patent: Nov. 10, 1987

[54] PROCESS FOR OBTAINING AND PROCESSING SEISMIC DATA MEASURED AT AN EXPLORATORY WELL

[75] Inventor: Jean-Jacques Raoult, Paris, France

[73] Assignee: Compagnie Francaise des Petroles, Paris, France

[21] Appl. No.: 685,659

[22] Filed: Dec. 24, 1984

[30] Foreign Application Priority Data

Jan. 19, 1984 [FR] France ................. 84 00779

[51] Int. Cl.$^4$ .............................................. G01V 1/00
[52] U.S. Cl. ......................................... 367/57; 367/43
[58] Field of Search ................................. 367/56–58, 367/43, 48; 181/102; 364/422, 421; 73/151

[56] References Cited

U.S. PATENT DOCUMENTS 3,371,310  2/1968  Silverman ............................. 367/57
3,652,980  3/1972  Goupillaud ............................ 367/46

FOREIGN PATENT DOCUMENTS 1569581  6/1980  United Kingdom ................. 367/57

*Primary Examiner*—Thomas H. Tarcza
*Assistant Examiner*—Daniel T. Pihulic
*Attorney, Agent, or Firm*—Sughrue, Mion, Zinn, Macpeak and Seas

[57] ABSTRACT

In a process for obtaining seismic data relating to an exploratory well, a seismic wave transmitter and a seismic wave receiver are provided, one arranged on the surface adjacent the well and the other at a plurality of measurement points down the well, and the output of the receiver is processed in a processing installation. The measurement points are divided into at least two groups, each of which comprises a plurality of measurement points spaced apart in a distance ($D_z$) which is less than a predetermined limit distance so as to avoid aliasing, and the groups of measurement points are separated from each other by a distance (D) greater than the limit distance. In the processing installation separation of the down-going waves from the up-going waves belonging to the same group is carried out before coherence filtration of the separated waves.

2 Claims, 8 Drawing Figures $$T = \begin{bmatrix} 1 & -2 & 1 & & & & & & & & & \\ & 1 & -2 & 1 & & & & & & & & \\ & & 1 & -2 & 1 & & & & & & & \\ & & & 1 & -2 & 1 & & & & & 0 & \\ & & & & \ddots & & & & & & & \\ & & & & & 1 & -2 & 1 & & & & \\ & & & & & & 1 & -2 & 1 & & & \\ & 0 & & & & & & 1 & -2 & 1 & & \\ & & & & & & & & 1 & -2 & 1 & \\ & & & & & & & & & \ddots & & \\ & & & & & & & & & & 1 & -2 & 1 \end{bmatrix}$$

FIG. 5.

$$\Delta = \begin{bmatrix} (INT(p/2)) & & & & (INT(-p/2)) & & \\ & \ddots & & 0 & & \ddots & 0 \\ 0 & & \ddots & & 0 & & \ddots \\ (INT(-p/2)) & & (INT(p/2)) & & (INT(p/2)) & & (INT(-p/2)) \\ & \ddots & & 0 & & \ddots & 0 \\ 0 & & \ddots & & 0 & & \ddots \\ & & (INT(-p/2)) & & & & (INT(p/2)) \end{bmatrix}$$

FIG. 6.

PROCESS FOR OBTAINING AND PROCESSING SEISMIC DATA MEASURED AT AN EXPLORATORY WELL

BACKGROUND OF THE INVENTION

The invention relates to the acquisition and processing of seismic data obtained using transmitter of seismic waves and receivers of down-going or up-going seismic waves, some of which are arranged on the surface near to an exploratory well and the others in the exploratory well at a succession of measurement points.

It is possible either to install a transmitter at the surface and lower a receiver down the well, or to install a receiver at the surface and lower a transmitter down the well. In general, a single piece of equipment is lowered down the well and fixed to the walls of the well by means of a mobile arm at a succession of positions which constitute the measurement points.

All the methods in current use require the provision, within the exploratory well, of a number of measurement points which are separated from each other by a distance less than a predetermined limit distance in order to avoid the ambiguity known as "aliasing" in the dephasing of the seismic waves received by the receiving equipment. This leads to a high cost, since seismic operations require a large staff and large quantities of equipment and are thus very time-consuming. Moreover, the desired precision is not always achieved, since, in determining the limit distance, all the waves and in particular the wave known as the tube wave are not taken into account, so as to avoid using an excessive number of measurment points.

The terms "down-going" and "up-going" as applied to seismic waves are used herein to describe waves the paths of which appear to go down and up, respectively, if the wave is considered as arriving at the measurement point. In other words, where a receiver is located at the measurement point, a down-going wave is one which travels downwardly to the measurement point and an up-going wave is one which travels upwardly to the measurement point. Where a transmitter is located at the measurement point, a down-going wave is one which travels upwardly from the measurement point and an up-going wave is one which travels downwardly from the measurement point.

With a view to reducing the number of measurement points necessary for the same quality of measurement, and to improving the latitude in the distribution of the measurement points so that certain zones may be favoured and a greater degree of precision can be obtained than obtained hitherto, an analysis was first made of the reasons for the restrictive nature of the known methods. It was found that the error in these methods lay in placing stress on coherence filtering and subordinating the separation of the descending and rising waves to this filtering, these two operations being carried out together; this leads, in particular, to an increased number of measurement points without any appreciable improvement in the quality of the measurement.

SUMMARY OF THE INVENTION

According to the invention, there is provided a process for obtaining seismic data measured at an exploratory well, using an installation for the acquisition of seismic data which comprises equipment for measuring seismic data comprising transmitting means for transmitting seismic waves and receiving means for receiving down-going or up-going seismic waves originating from the transmitting means, which are arranged on the surface adjacent the exploratory well and at measurement points in the exploratory well, the measurement points being divided into at least two groups spaced apart down the well, each group comprising a plurality of measurement points equally spaced apart down the well by a distance which is less than a predetermined limit distance so as to avoid ambiguity (aliasing) in the dephasing of the seismic waves received by the receiving means, adjacent measurement points of adjacent groups being separated by a distance greater than said limit distance, and an installation for processing the seismic data provided by the installation for acquisition of the data, which processing installation separates the down-going waves from the up-going waves belonging to the same group and carries out coherence filtering of the waves.

Coherence filtering is preferably then carried out, after separation of the waves, on the set of down-going waves belonging to all the groups, on the one hand, and on the set of up-going waves belonging to all the groups, on the other. Initial rough filtering may also be performed, at the same time as separation of the waves, on the down-going and up-going waves of the same group. It will also be noticed that the operation of separation of the waves itself involves a certain degree of coherence filtering.

Display of the seismic readings obtained in accordance with the procedure described above may be improved by carrying out an interpolation, as a function of the depth, separately on the descending waves and on the rising waves after their separation and coherence filtering.

BRIEF DESCRIPTION OF THE DRAWINGS

An embodiment according to the present invention will now be described, by way of example only, with reference to the accompanying drawings.

In the drawings:

FIGS. 5 and 6 are the matrices used in the processing;

DETAILED DESCRIPTION OF THE PREFERRED EMBODIMENTS

Figure 1:
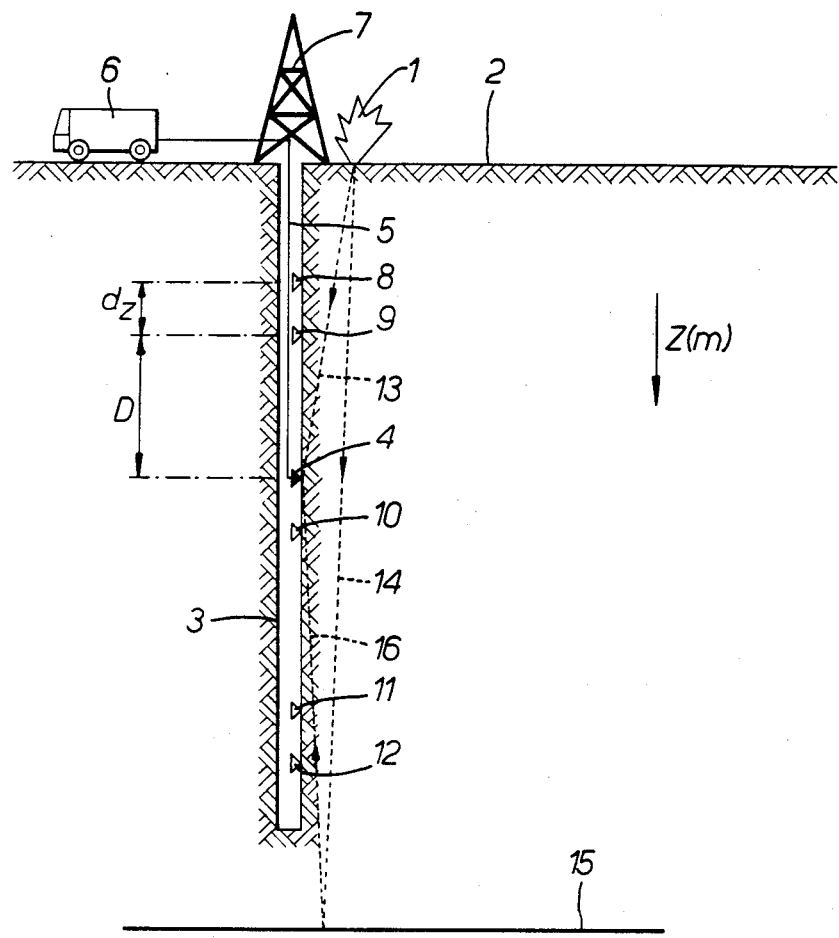
FIG. 1 shows, in diagrammatic form, an exploratory well and an installation for acquisition of seismic data.

In the installation for acquisition of seismic data, shown in FIG. 1, it is assumed that a transmitter 1 of seismic waves is positioned on the surface 2 whilst a receiver 4 of seismic waves is lowered down the shaft 3 of the well with the aid of an electrically conducting cable 5 connected to a heavy good vehicle 6 via means for recording the seismic data transmitted by the receiver 4 and, where appropriate, means for processing the data. The processing equipment can, in whole or in part, be situated in a distant place such as a laboratory.

As has already been said, the positions of the transmitter and of the receiver can be interchanged.

Apart from the present position of the receiver 4, the diagram shows five other positions in which the receiver is placed in succession against the wall of the shaft 3 in order to take measurements. These positions, which are spaced apart down the shaft 3, are shown on the drawing by the reference numbers 8, 9, 10, 11, 12.

It will be seen that these positions are divided into three separate groups, each consisting of two positions close together. Thus there is: a first group of two measurement points 8, 9 spaced apart down the well by a distance $d_z$; a distance D between the measurement point 9 and the adjacent measurement point 4 of the second group formed by the two measurement points 4 and 10; a distance $d_z$ between the measurement points 4 and 10; a distance D between the measurement point 10 and the adjacent measurement point 11 of the third group formed by the two measurement points 11 and 12 which are spaced apart by a distance $d_z$.

Only three groups, each consisting of two measurement points, have been shown, so as not to overload the figure, but the number of groups may be different and the number of measurement points per group may be higher (it must always be at least equal to the number of waves to be separated).

The line 13 represents a down-going seismic wave arriving directly at position 4, and the line 14 represents a seismic wave which is reflected at an interface 15 separating parts of the terrain with differing impedances, so as to produce an up-going wave represented by a line 16 which ends at position 4.

Figure 2:
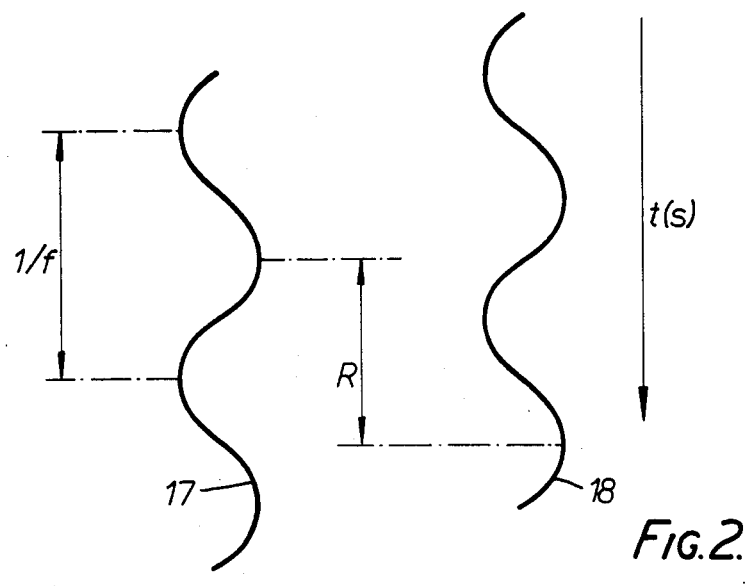
FIG. 2 shows two waves of the same origin arriving at two measurement points respectively.

FIG. 2 shows a wave 17 arriving at a measurement point such as 4 and a wave 18 which is the wave from the same origin arriving at the other point of measurement such as 10 of the same group of measurement points. The time interval between these waves, R, in time t is equal to $d_z/V_z$, where $d_z$ is the distance between the measurement points such as 4 and 10 and $V_z$ the velocity of propagation of the wave at depth z, if it is assumed as a first approximation that the velocity of propagation $V_z$ of the seismic waves varies only slightly between the measurement points 4 and 10 and that the transmitter 1 is so near to the well 3 that we can regard the distance traversed by the wave arriving at 4 as differing by a length $d_z$ from the distance traversed by the wave arriving at 10. In order to measure the time interval R without ambiguity, $d_z/V_z$ must be less than $\frac{1}{2}f_{max}$, where $f_{max}$ is the maximum frequency of the waves received.

The distance $d_z$ between the measurement points of the same group must therefore be less than a limit distance $d_{zmax}$ equal to $V_z/2f_{max}$. The distance D between groups can, on the contrary, be several times greater than $d_{zmax}$. FIG. 1 shows an embodiment which constitutes an improvement in seismic sampling. It is known that seismic sampling is a method aiming at obtaining the times of arrival, at various points in the well, of a wave originating at the surface of the well. By installing at these points not one single measurement point, but two measurement points close together, information of far greater importance is obtained, which is in practice equivalent to that at present obtained by the methods of vertical seismic profile, known as VSP, which are time-consuming and expensive.

It is also possible to use the method of separate groups of measurement points in a non-uniform manner along the well. In a zone where particularly precise information is required, the groups of measurement points are brought closer together and it is possible to bring the measurement points of the same group closer together so that they are located at a distance less than the limit distance $d_{zmax}$ calculated for the velocity of the tube wave. Better distribution of the measurement points will thus make it possible, without necessarily increasing the total number of measurement points, to obtain data carrying more information, such data enabling separation, without ambiguity, of the different waves (up-going waves, down-going waves, up-going tube waves and down-going tube waves).

Figure 3:
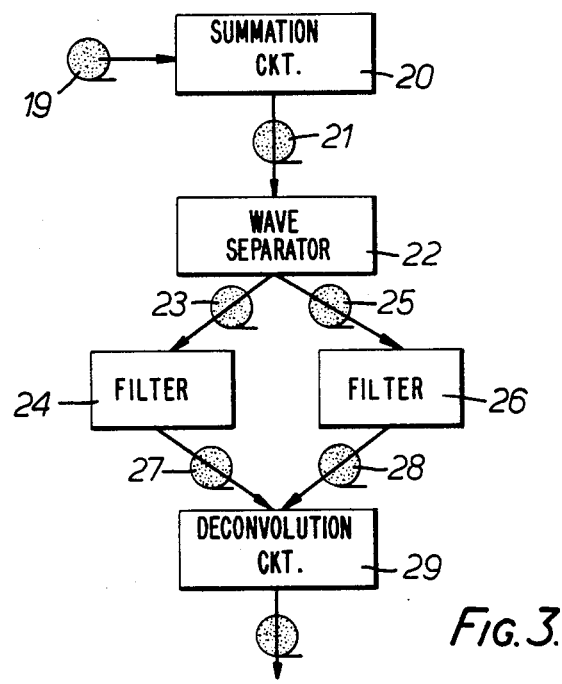
FIGS. 3 and 4 are respectively a diagram of the organisation of processing of the recorded data and a flowchart of the successive operations performed.

FIG. 3 shows the organisation of the data processing. The traces, that is the sets of values as functions of time which are recorded by the receiver at a given measurement point, arrive at 19 in a pre-processing apparatus 20 in which bad recordings are eliminated, in which the recordings corresponding to one measurement point are added together and in which an initial filtering can be carried out, if required. The recordings 21 thus calculated then pass into a wave separation apparatus 22 which provides on the one hand, at 23, the recordings relating to the down-going waves which are coherence-filtered by a filter 24 and on the other hand, at 25, the recordings relating to the up-going waves which are coherence-filtered by a filter 26, the outputs 27 and 28 of these filters being connected to an apparatus 29 for deconvolution of the up-going waves by the down-going waves and for the interpolation of them.

Figure 4:
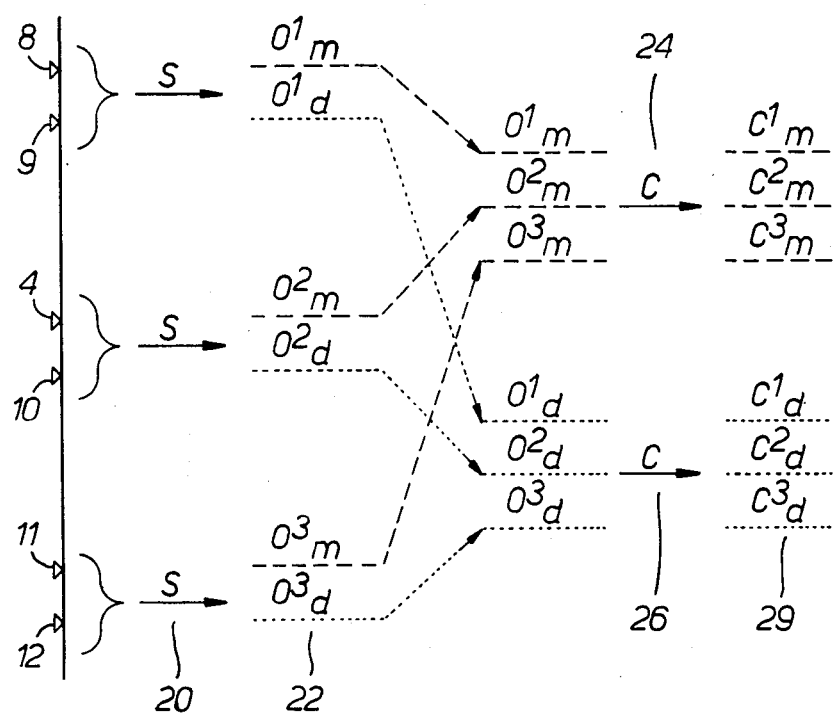

FIG. 4 shows, in diagrammatic form, the successive operations carried out starting at the measurment points 8, 9, 4, 10, 11, 12 in the apparatus 20 (summation), 22 (separation of the recordings of up-going waves $O^1{}_m$, $O^2{}_m$, $O^3{}_m$ and of down-going waves $O^1{}_d$, $O^2{}_d$, $)^3{}_d$), 24 and 26 (separate coherence filtering of the set of up-going waves and of the set of down-going waves), 29 (obtaining three coherent and processed up-going traces $C^1{}_m$, $C^2{}_m$, $C^3{}_m$ and three coherent and processed down-going traces $C^1{}_d$, $C^2{}_d$, $C^3{}_d$.

The equipment for transmission and reception of the waves can be the conventional equipment in current use. The only difference lies in their positioning. The processing of the recordings is organised as stated above but it is carried out by means of conventional equipment such as that already in use in the known filter system in the f-z region or in filter systems in the t-z region.

The augmentation coherence filtering applied after separation of the waves concerns only one wave at a time, and hence, since dephasing of the wave concerned is known, it is not affected by spatial aliasing. This filtering can be uni-directional or almost so and oriented according to the gradient of the wave concerned. Coherence filtering is very easily carried out if it is preceded by a horizontalisation of the waves, that is removal of the relative dephasings of the waves trace by trace, this being done for each wave.

During coherence filtering it is possible to take into account the estimated depths of the traces corresponding to the up-going and down-going waves. In the case of two traces or measurement points in each group, the means value is taken. In the case where the groups include more traces or measurement points, the depth of the barycentre of the measurement point is used.

By way of example, a more detailed description will be given of a wave separation method which can be used.

The first step will have been to measure the dephasings of the first waves to arrive, trace by trace, by checking them on the films.

It wil be assumed that the distance from the transmitting equipment to the surface opening of the well is small and that the geological interfaces through which the well passes are very close to the horizontal in such a manner that the paths of the up-going and down-going waves may be regarded as vertical. Thus, if the dephasing of the down-going waves from one trace to another is p, the dephasing of the corresponding rising waves will be −p, whatever the law of velocities in the well.

In order to simplify the presentation, only two categories of waves, up-going waves and down-going waves, and two traces will be considered, the dephasing of the down-going wave for these two traces being p.

We will denote one of these traces (trace 1) by $S_1$ and the other of these traces (trace 2) by $S_2$. The latter are known for a discrete set of values E:

$$E = \{0, \Delta t, 2\Delta t, \ldots, n\Delta t\}$$

where $\Delta t$ represents the time between successive recordings and $n\Delta t$ the total time of recording.

It will further be assumed that the traces $S_1$ and $S_2$ are situated at depths $z_1$ and $z_2$ respectively.

An estimate of the down-going waves (denoted by $\hat{d}$) and the up-going waves (denoted by $\hat{m}$) at the point $(z_1+z_2)2$ will now be made.

For this purpose, it will be assumed that these waves have respectively a constant dephasing of p and −p on the segment $(z_1, z_2)$ and that, in addition, their amplitudes do not vary along their respective tracks.

The model following from the above hypotheses will then be:

$$\hat{S}_1(t) = \hat{d}(t+p/2) + \hat{m}(t-p/2)$$

$$\hat{S}_2(t) = \hat{d}(t-p/2) + \hat{m}(t+p/2)$$

By introducing the Dirac distribution, these equations can then be written in the form:

$$\hat{S}_1(t) = \delta(t+p/2) * \hat{d}(t) + \delta(t-p/2) * \hat{m}(t)$$

$$\hat{S}_2(t) = \delta(t-p/2) * \hat{d}(t) + \delta(t+p/2) * \hat{m}(t)$$

It is seen that in this case the waves themselves, $\hat{d}$ and $\hat{m}$, are separated from their phases p/2 or −p/2.

It is possible to restrict these equations to one time interval.

The centre of this time interval will be fixed on a time $k\Delta t$ and its half-length will be $l\Delta t$.

Within this time interval, the waves $\hat{d}$ and $\hat{m}$ will then be investigated by minimising the distance, in the direction of the normal $L^2$, between the estimated traces $\hat{S}_1$ and $\hat{S}_2$ and the actual traces $\hat{S}_1$ and $\hat{S}_2$.

This is equivalent to minimising the expression $K_{k,1}(d,m)$ such that:

$$K_{k,l}(d,m) = \sum_{i=k-l}^{i=k+l} |S_1(i\Delta t) - \hat{S}_1(i\Delta t)|^2 + \sum_{i=k-l}^{i=k+l} |S_2(i\Delta t) - \hat{S}_2(i\Delta t)|^2$$

By introduction of the vectors o, S and $\hat{S}$ such that:

$$\hat{o} = \begin{bmatrix} \hat{d} \\ \hat{m} \end{bmatrix} \quad S = \begin{bmatrix} S_1 \\ S_2 \end{bmatrix} \quad \hat{S} = \begin{bmatrix} \hat{S}_1 \\ \hat{S}_2 \end{bmatrix}$$

(o stands for wave)
and the different sub-vectors representing the value of the functions corresponding to them in the time interval concerned, it is then possible to express:

$$K_{k,l}(\hat{o}) = |S - \hat{S}|^2$$

Two constraints will be placed on this functional operator in order to stabilise the calculations. One constraint will be:

$$C_1(\hat{o}) = \gamma^2 |\hat{o}|^2$$

which is intended to remove instabilities; the other constraint will be:

$$C_2(\hat{o}) = \lambda^2 \hat{o}^t T \hat{o}$$

where T is defined by the matrix shown in FIG. 5.

This is equivalent to limiting the variations of the two waves $\hat{d}$ and $\hat{m}$. The formulation of $C_2(\hat{o})$ is in fact:

$$C_2(\hat{o}) = \sum_{i=k-l}^{i=k+l-1} |\hat{d}(j\Delta t) - \hat{d}((j+1)\Delta t)|^2 + \sum_{i=k-l}^{i=k+l-1} |\hat{m}(j\Delta t) - \hat{m}((j+1)\Delta t)|^2$$

The final function to be considered will therefore be:

$$G_{k,l}(\hat{o}) = K_{k,l}(\hat{o}) + C_1(\hat{o}) + C_2(\hat{o})$$

and values of $\hat{o}$ will be determined such that $$\frac{\partial G_{k,l}}{\partial \hat{o}} = [o], [o] \text{ zero vector}$$

This equation leads to the following system:

$$(\Delta^t \Delta + \epsilon^2 I + \lambda^2 T)\hat{o} = \Delta^t S$$

where $\Delta$ is the matrix shown in FIG. 6 and I the matrix identity.

Int(x), the linear interpolation operator is such that:

$$\text{Int}(t+x) \cdot \hat{d} = \hat{d}(t+x)$$

$$\text{Int}(t+y) \cdot \hat{m} = \hat{m}(t+y)$$

It must be noted that Int(x) is a vector of length equal to that of the interpolation operator. This linear interpolation operator plays the part of the Dirac distribution, in the sense that it permits separation of the phase term proper from the signal under consideration.

To calculate $\hat{o}$, it is necessary merely to invert the matrix:

$$(\Delta^t \Delta + \epsilon^2 I + \lambda^2 T)$$

This gives:

$$\hat{o} = (\Delta^t \Delta + \epsilon^2 I + \lambda^2 T)^{-1} \Delta^t S$$

or $$o = \nabla S$$

by putting:

$$\nabla = (\Delta^t \Delta + \epsilon^2 I + \lambda^2 T)^{-1} \Delta^t$$

Within the time interval considered, the following is thus obtained:

$$[d/m] = \nabla[S_1/S_2]$$

Only the corresponding central operators will be retained.

Figure 7:
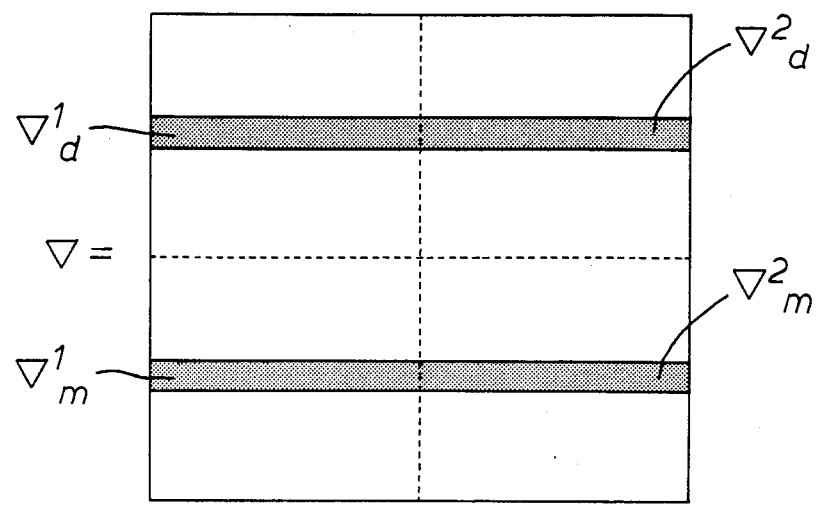
FIG. 7 shows a matrix with operator for separation of waves.

For example, in the time interval under consideration centered on time $k\Delta t$, the following is obtained:

$$d(k\Delta t) = \nabla_d^1 \cdot S_1 + \nabla_d^2 S_2$$

$$\hat{m}(k\Delta t) = \nabla_m^1 \cdot S_1 + \nabla_m^2 S_2$$

the time interval and the operators being shown in FIG. 7.

It can be seen, therefore, that the calculation of the waves under consideration is presented in the form of two scalar products between separation operators and intervals in traces.

It is sufficient to calculate, once for all the separation operators for different values of p, the dephasing of the descending wave fo trace 1 with respect to trace 2.

Once these operators have been calculated, they are stored on discs. To use them, they must be re-read and applied in the form of a double convolution to the two traces under consideration, and the down-going and up-going waves must then be calculated.

It will now be explained how the coherence filtering can be carried out after using this method of separation.

It will be assumed that the traces under consideration are effectively formulated by: $S = \Delta \cdot o + \beta$; o being the vector corresponding to the descending and rising waves, and $\beta$ being noise.

We then obtain o from the knowledge of S:

$$o = \nabla \cdot S$$

or:

$$o = \nabla \cdot \Delta o + \nabla \cdot \beta$$

It is seen that $o = o + \nabla \cdot \beta \cdot =$ being the generalised inverse of $\Delta$.

Therefore there remains only the added noise $\nabla \cdot \delta$.

This can be anything and in particular will not be coherent with regard to the slopes p and $-p$.

A coherence filter will then be applied, which will not modify o, since the latter satisfies the hypotheses of the coherence filter with regard to the slopes p and $-p$. In contrast, this coherence filter will act on the residual noise $\nabla \cdot \beta$.

In order to increase the effectiveness of the latter, it will be applied to a fairly large number of traces; the degree of coherence will be increased as the number of traces used increases.

It is possible, at this point in the processing, to use a filter known as f−k (k being the wave number) in the Fourier region on the waves under consideration after horizontalisation.

Figure 8:
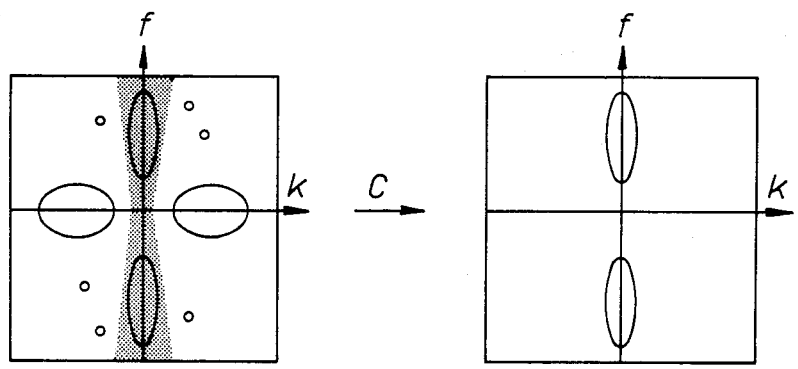
FIG. 8 is a diagram of coherence filtering in the two-dimensional Fourier region known as f−k.

In this case, it is sufficient to preserve a signal cone more or less open, this being an inverse function of the degree of coherence required, as is shown in FIG. 8.

It is easy to generalise the method of separation described for two directions, firstly by increasing the coherence and secondly by separating a larger number of waves.

In fact, by using the following formulations: $s = \Delta \cdot \hat{o}$ it can be assumed that s is of form:

$$S = \begin{bmatrix} s_1 \\ s_2 \\ s_3 \\ s_N \end{bmatrix}$$

where N is the number of traces taken into consideration, and the larger N the larger the final coherence.

It is also possible to take o such that:

$$o = \begin{bmatrix} \hat{o}_1 \\ \hat{o}_2 \\ \hat{o}_3 \\ \hat{o}_M \end{bmatrix}$$

where M is then the number of waves which it is required to separate. Thus it is possible to integrate the up-going and down-going waves, as well as the up-going and down-going tube waves, the number M then being equal to 4.

From an informational point of view, it is necessary for N to be greater or equal to M.

It will be noted that in the case where it is required to filter tube waves, to avoid aliasing of the latter, the spacing between the recording points must in general be very small.

By use of the method of group sampling, the filtering of these waves is economically possible.

It is sufficient to record groups of four traces and to apply the separation operators to these four traces in order to obtain the up-going and down-going waves. We could obtain in the same manner the up-going and down-going tube waves, but these are of no interest at present. They need, in particular, to be eliminated.

After this separation process, it is possible to apply coherence filtering to each of the waves under consideration, each of them being pure with regard to the dephasings considered, also known as the slopes of the different waves. In order to estimate the slope of the tube waves, it is sufficient to have an estimate of the latter taken from a film of seismic profile summed in the vertical. It is not necessary to have the time of first arrival of the waves, since only the slope of the tube waves can be taken into account.

It will be appreciated from the foregoing that use is made of an entirely different approach to the current known approach in that the above described process provides for optimum separation of the waves independently of coherence filtering.

I claim:

1. A process for obtaining seismic data measured at an exploratory well (3), using an installation for an acquisition of seismic data which comprises equipment for measuring seismic data including transmitting means (1) for transmitting seismic waves and receiving means (4)

for receiving down-going or up-going seismic waves originating from said transmitting means, said transmitting means and said receiving means being individually disposed at a single position on a surface of the ground adjacent said exploratory well and at a plurality of vertically spaced measurement points (8,9,4,10,11,12) in said exploratory well, and an installation for processing the seismic data provided by said installation for the acquisition of the data, said processing installation separating said down-going waves from said up-going waves and carrying out coherence filtering of said waves, wherein said measurement points are divided into at least two groups vertically spaced apart down the well, wherein each group comprises a plurality of said measurement points equally spaced apart down said well by a distance (dz) which is less than a predetermined limit distance to avoid aliasing ambiguities in a dephasing of said seismic waves received by said receiving means, wherein closest measurement points of adjacent groups are separated by a distance (D) greater than said limit distance, and wherein said processing installation carries out a separation of said down-going waves and said up-going waves belonging to the same group.

2. A process according to claim 1, wherein, to improve display of the seismic readings, an interpolation as a function of well depth is carried out separately on said down-going waves and on said up-going waves after their separation and coherence filtering.

* * * * *